United States Patent
Bakker et al.

(10) Patent No.: US 12,062,225 B2
(45) Date of Patent: Aug. 13, 2024

(54) DEEP NEURAL NETWORK VISUALISATION

(71) Applicant: KONINKLIJKE PHILIPS N.V., Eindhoven (NL)

(72) Inventors: Bart Jacob Bakker, Eindhoven (NL); Dimitrios Mavroeidis, Utrecht (NL); Stojan Trajanovski, London (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 429 days.

(21) Appl. No.: 17/615,946

(22) PCT Filed: May 25, 2020

(86) PCT No.: PCT/EP2020/064355
§ 371 (c)(1),
(2) Date: Dec. 2, 2021

(87) PCT Pub. No.: WO2020/244941
PCT Pub. Date: Dec. 10, 2020

(65) Prior Publication Data
US 2022/0319159 A1    Oct. 6, 2022

(30) Foreign Application Priority Data

Jun. 6, 2019 (EP) .................................. 19178746

(51) Int. Cl.
*G06V 10/764* (2022.01)
*G06V 10/772* (2022.01)
(Continued)

(52) U.S. Cl.
CPC .......... *G06V 10/764* (2022.01); *G06V 10/772* (2022.01); *G06V 10/774* (2022.01); *G06V 10/82* (2022.01)

(58) Field of Classification Search
None
See application file for complete search history.

(56) References Cited

U.S. PATENT DOCUMENTS

| 11,256,958 | B1* | 2/2022 | Subbiah | ............. G06F 18/2155 |
| 2018/0322406 | A1 | 11/2018 | Merrill | |
| 2020/0118691 | A1 | 4/2020 | Kiljanet | |

OTHER PUBLICATIONS

PCT International Search Report, International application No. PCT/EP2020/064355, Aug. 6, 2020.
(Continued)

*Primary Examiner* — Leon Flores
(74) *Attorney, Agent, or Firm* — Sherry Austin (57) ABSTRACT

Aspects and embodiments relate to a method of providing a representation of a feature identified by a deep neural network as being relevant to an outcome, a computer program product and apparatus configured to perform that method. The method comprises: providing the deep neural network with a training library comprising: a plurality of samples associated with the outcome; using the deep neural network to recognise a feature in the plurality of samples associated with the outcome; creating a feature recognition library from an input library by identifying one or more elements in each of a plurality of samples in the input library which trigger recognition of the feature by the deep neural network; using the feature recognition library to synthesise a plurality of one or more elements of a sample which have characteristics which trigger recognition of the feature by the deep neural network; and using the synthesised plurality of one or more elements to provide a representation of the feature identified by the deep neural network in the plurality of samples associated with the outcome. Accordingly, rather than visualising a single instance of one or more elements in a sample which trigger a feature associated with an outcome, it is possible to visualise a range of samples including elements which would trigger a feature associated with an outcome, thus enabling a more comprehensive view of operation of a deep neural network in relation to a particular feature.

20 Claims, 5 Drawing Sheets

(51) Int. Cl.
    *G06V 10/774*     (2022.01)
    *G06V 10/82*      (2022.01)

(56) References Cited

OTHER PUBLICATIONS

Selvaraju R. et al., "Grad-CAM: Visual Explanations from Deep Networks via Gradient-based Localization", IEEE International Conference on Computer Vision (ICCV'17), pp. 618-626, 2017.

Goodfellow I.J. et al., "Generative Adversarial Networks", Machine Learning (stat.ML), pp. 1-9, Jun. 2014.

Krizhevsky A. et al., "ImageNet Classification with Deep Convolutional Neural Networks", Advances in Neural Information Processing Systems 25, NIPS 2012.

Tobias J. et al., "Striving for Simplicity: The All Convolutional Net", CORR (ARXIV), vol. abs/1412.6806v3, Apr. 13, 2015 (Apr. 13, 2015), pp. 1-14, XP055293816.

Maayan F-A. et al., "GAN-Based Synthetic Medical Image Augmentation for Increased CNN Performance in Liver Lesion Classification", arxiv.org, Cornell University Library, Ithaca, NY 14853, Mar. 3, 2018, XP081134953.

Chen X. et al., "InfoGAN: Interpretable Representation Learning by Information Maximizing Generative Adversarial Nets", cs.CV, Jun. 12, 2016.

Chattopadhyay A. et al., "Grad-CAM++: Improved Visual Explanations for Deep Convolutional Networks", Convolutional Neural Networks, Computer Vision, cs.CV, Nov. 9, 2018.

Simonyan K. et al., "Deep Inside Convolutional Networks: Visualising Image Classification Models and Saliency Maps", Dec. 20, 2013 (Dec. 20, 2013), XP055541250.

Fei L. et al., "Fei—Lecture 12: Visualizing and Understanding", Mar. 16, 2017, XP055644142.

Nguyen A. et al., "Synthesizing the Preferred Inputs for Neurons in Neural Networks via Deep Generator Networks", May 30, 2016, p. 3, 7, XP055488691.

Yasinski J. et al., "Understanding Neural Networks Through Deep Visualization", Copyright, Jun. 22, 2015 (Jun. 22, 2015), XP055464724.

\* cited by examiner

Figure 2d 4 channel random noise navigation

Operating the sliders smoothly changes the example image

Example image for 'spiculation' feature

Figure 3

DEEP NEURAL NETWORK VISUALISATION

CROSS-REFERENCE TO PRIOR APPLICATIONS

This application is the U.S. National Phase application under 35 U.S.C. § 371 of International Application No. PCT/EP2020/064355, filed on May 25, 2020, which claims the benefit of European Application No. 19178746.4, filed on Jun. 6, 2019. These applications are hereby incorporated by reference herein.

FIELD OF THE INVENTION

The invention relates to the field of neural networks, and more particularly providing a representation of a feature identified by a deep neural network.

BACKGROUND OF THE INVENTION

Deep learning methods can be used in relation to the generation or identification of useful, high level features from very low level data, for example, colour values of single pixels in a medical image. Deep learning methods can mitigate a need to handcraft such useful high level features and may allow for automatic definition of "unknown" features. The features generated or learned by deep learning methods are defined via a large set of weightings in a deep neural network.

Although deep neural networks configured to make decisions or identify outcomes based on a set of input samples often perform well; they can appear to a user to function largely as a black box. That is to say, it can be difficult to explain or visualise how a deep neural network is functioning and why it operates to make the decisions that it makes.

Techniques exist to visualize regions (or patches) in a larger sample or example image which activate the generated or learned features (i.e. indicate the presence of a feature in the image). One such technique is referred to as Grad-CAM (Grad-CAM: Visual Explanations from Deep Networks via Gradient-based Localization [Selvaraju et al, arXiv:1610.02391]) and provides a way to highlight those pixels in the input image which contribute to, for example, an image classification. In one example, when an image is classified by a deep neural network as a 'dog', pixels in the image that correspond to one or more features that contribute to the deep neural network classifying the image as a "dog" are highlighted. The Grad-CAM technique can be applied to image analysis using deep convolutional neural networks. Such techniques allow a user to inspect a specific example of an image which triggers a network to recognise a feature.

SUMMARY OF THE INVENTION

A first aspect of the invention relates to a method of providing a representation of a feature identified by a deep neural network as being relevant to an outcome; the method comprising: providing the deep neural network with a training library comprising: a plurality of samples associated with the outcome; using the deep neural network to recognise a feature in the plurality of samples associated with the outcome; creating a feature recognition library from an input library by identifying one or more elements in each of a plurality of samples in the input library which trigger recognition of the feature by the deep neural network; using the feature recognition library to synthesise a plurality of one or more elements of a sample which have characteristics which trigger recognition of the feature by the deep neural network; and using the synthesised plurality of one or more elements to provide a representation of the feature identified by the deep neural network in the plurality of samples associated with the outcome.

A second aspect of the invention provides a computer program product operable, when executed on a computer, to perform the method of the first aspect.

A third aspect of the invention provides apparatus to provide a representation of a feature identified by a deep neural network as being relevant to an outcome; the apparatus comprising: a deep neural network provided with a training library comprising: a plurality of samples associated with the outcome and configured to recognise a feature in the plurality of samples associated with the outcome; library creation logic configured to create a feature recognition library from an input library by identifying one or more elements in each of a plurality of samples forming the input library which trigger recognition of the feature by the deep neural network; synthesis logic configured to use the feature recognition library to synthesise a plurality of one or more elements of a sample which have characteristics which trigger recognition of the feature by the deep neural network; and feature visualisation logic configured to use the synthesised plurality of one or more elements to provide a representation of the feature identified by the deep neural network in the plurality of samples associated with the outcome.

Further particular and preferred aspects are set out in the accompanying independent and dependent claims. Features of the dependent claims may be combined with features of the independent claims as appropriate, and in combinations other than those explicitly set out in the claims.

One technical advantage of an embodiment of the invention may include: a mechanism to improve a model created by a deep neural network. Another advantage of an embodiment of the invention may include: a mechanism to identify data relating to features relevant to an outcome which may be missing from a training library provided to a deep neural network. Yet another advantage of an embodiment of the invention may include: a mechanism to visualise features identified by different layers in a deep neural network. A further advantage of an embodiment of the invention may include: a mechanism to provide a domain expert with features created by a model relevant to an outcome created by a deep neural network. Yet a further advantage of an embodiment of the invention may include: a mechanism to aid domain expert understanding of operation of a deep neural network. Further technical advantages might be further described in the description of the embodiments. The foregoing technical advantage(s) are intended as non-limiting examples only. The person skilled in the art will recognize that other technical advantages might apply, which have not been explicitly described, and that different advantages might to different embodiments.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF EMBODIMENTS OF THE INVENTION

Before describing specific illustrative examples in detail, a general overview is provided.

Generally, embodiments of the invention relates to methods and systems which can provide a representation of a feature identified by a deep neural network as being relevant to an outcome. Methods of embodiment of the invention typically comprise: providing the deep neural network with a training library comprising: a plurality of samples associated with the outcome; and using the deep neural network to recognise a feature in the plurality of samples associated with the outcome. It is then possible to create a feature recognition library from an input library by identifying one or more elements in each of a plurality of samples in the input library which trigger recognition of the feature by the deep neural network. That feature recognition library can be used to synthesise a plurality of one or more elements of a sample which have characteristics which trigger recognition of the feature by the deep neural network. The synthesised plurality of one or more elements can then be used to provide a representation of the feature identified by the deep neural network in the plurality of samples associated with the outcome. That visualisation can be used to improve the operation of the deep neural network. For example, features which are known to be of interest in relation to an outcome which appear to be absent from those features identified by a deep neural network can be identified as being missing from the training library, the training library can be updated to include training material including those missing features and a model created by the deep neural network improved.

It has been recognised that methods and apparatus to provide a user with a representation of a feature identified by a deep neural network as being relevant to an outcome may be useful. That is to say, providing a user with a visual or otherwise human-readable or human-understandable indication of one or more features of input data which lead to recognition or identification of an "outcome" can be a useful means to understand how a deep neural network is functioning and, for example, whether connections or associations made by a deep neural network in relation to training data appear to validate or correspond to what might already be known about the training data. In other words, representations of features identified by the deep neural network can aid understanding of a model created by the deep neural network.

Some embodiments of the invention recognise that one possible way to provide a representation of a feature identified by a deep neural network as being relevant to an outcome, and thus to provide a human understandable information to allow for operation of a system to be understood, may be to perform a multi-stage process in which various information libraries are used.

A typical way of training a deep neural network in relation to, for example, images, might be to provide the deep neural network with a training library comprising: a plurality of samples (images) associated with an outcome and to use the deep neural network to recognise a feature in the plurality of samples associated with the outcome. In relation to medical images, for example, an outcome may be diagnosis of a disease, syndrome or similar and the features may, for example, comprise: recognition of a particular shape of an organ, or particular image patterns indicative of a type of tissue.

In illustrated examples of the invention, after a standard deep neural network training process is completed, further processing of the information obtained can be undertaken. For example, in relation to each feature recognised by the deep neural network as being of relevance to an outcome, it may be possible to create a feature recognition library from an input library. The feature recognition library may be created by identifying one or more elements in each of the plurality of samples which trigger recognition of the feature by the deep neural network. In the case of images, the elements in the samples may be particular pixels, patches, or combinations of pixels and/or patches of an image in the input library. It is the relevant elements of the input image (rather than the input image as a whole) which forms an entry in the feature recognition library.

The feature recognition library can then itself be used as a tool to enhance understanding of operation of the deep neural network. In relation to each feature, it is possible to use a relevant feature recognition library to synthesise a plurality of one or more elements of a sample which have characteristics which trigger recognition of the feature by the deep neural network. One way of achieving this might be the use of a GAN in relation to the feature recognition library. At a conceptual level, an appropriately trained GAN (or similar) allows a user to explore a range of parameters that characterise samples which will trigger a deep neural network to recognise a feature.

Finally, in some illustrative examples, it will be appreciated that it can be useful for a user to be able to use the synthesised plurality of one or more elements to provide a representation of the feature identified by the deep neural network in the plurality of samples associated with the outcome. In particular, a user can explore a range of parameters that characterise samples which will trigger a deep neural network to recognise a feature.

Some embodiments of the invention recognise that rather than visualising a single instance of one or more elements in a sample which trigger a feature associated with an outcome, it is possible to visualise a range of samples including elements which would trigger a feature associated with an outcome, thus enabling a more comprehensive view of the operation of a deep neural network in relation to a particular feature.

Some embodiments of the invention recognise that a visualisation tool which allows artificial intelligence (AI) and/or application domain (for example, medical) specialists to analyse features identified by a deep neural network to be of relevance to an outcome or decision may be helpful. In particular, a visualisation tool which allows some identified or generated features to be recognised or expressed in general terms, for example, medical terms in relation to medical imaging, may help foster user trust in operation of a deep neural network. Furthermore, a visualisation tool may allow some features identified by a deep neural network to be dismissed as unwanted features, for example, overfitted or hospital-specific features, and for those features to be corrected for within a system, or appropriate amendments to be made to training data to account for or otherwise remove those "unwanted features", so that a more accurate and precise system for identifying features can be provided.

A visualisation tool in accordance with some embodiments of the invention may assist in recognising that a feature identified by a deep neural network may provide new insights for improving understanding. It will also be appreciated that a domain expert may be able to more fully understand how a deep neural network is operating if feature visualisation is effective and, for example, identify any possible "missing" features. Input from the domain expert may then be used to extend training examples given to the neural network, thus allowing for a deep neural network to perform an improved generalization.

Some embodiments of the invention may provide a representation or visualisation of a feature identified by a deep neural network as being relevant to an outcome. The representation may comprise a human-interpretable representation. For example, the visualisation may comprise one or more images comprising one or more elements which can be successfully interpreted by a human. Since deep neural networks may also, for example, be used in relation to classification of samples other than images, for example, trace signals, sounds or similar, the visualisation or representation may comprise one or more elements of such a trace or sound which is interpretable by a human. The method may comprise: providing a deep neural network with a training library comprising: a plurality of samples associated with the outcome. The method may comprise the steps of using the deep neural network to recognise a feature in the plurality of samples associated with the outcome. Accordingly, features related to an outcome are constructed by the deep neural network and analysis of those features can be performed. The method may comprise a step of creating a feature recognition library from an input library, which may comprise the training library, a combination of parts of the training library and some domain samples, a sub-set of the training library, or a set of samples which are in the same domain as those samples in the training library. The feature recognition library may be created by identifying one or more elements in each of a plurality of samples in the input library which trigger recognition of the feature by the deep neural network. The method may comprise the step of using the feature recognition library to synthesise a plurality of one or more elements of a sample which have characteristics which trigger recognition of the feature by the deep neural network. The synthesis process may enable a range of the one or more elements of any particular sample in a domain to be generated, each of which have characteristics which trigger recognition of the feature by the deep neural network. The method may allow for use of the synthesised plurality of one or more elements to provide a representation of the feature identified by the deep neural network in the plurality of samples associated with the outcome.

According to one embodiment of the invention, the representation of the feature comprises: a continuous library of synthesised examples which have characteristics which trigger recognition of the feature by the deep neural network. In other words, creation of a plurality of synthesised examples is possible, those examples being infinitely variable or smooth within a range identified which still triggers a deep neural network to trigger recognition of a given feature. Such a feature can enable a domain expert to understand a full range of, for example, a visual feature in an image which would trigger recognition of that feature by the neural network. The imaging of a continuous range can better aid a domain expert when understanding the parameters of a feature, for example, speculation, or tissue abnormality, which would trigger recognition of that feature by the deep neural network.

According to one embodiment of the invention, identifying one or more elements in each of the plurality of samples which trigger recognition of the feature by the deep neural network comprises: using a gradient based method to identify one or more elements in each of the plurality of samples which trigger recognition of the feature.

Such gradient based methods allow for generation of a heat or weight map in relation to elements of a sample, those heat or weight maps indicating which parts of a sample are of relevance or "key" to a deep neural network recognising a given feature of relevance to an outcome.

According to one embodiment of the invention, the gradient based method comprises: one or more of: Grad-CAM, CAM, deconvolution or guided back-propagation. As described above, Grad-CAM provides a way to highlight those pixels in the input image which contribute to, for example, an image classification. CAM, deconvolution and guided back-propagation all comprise similar methods for recognising elements of a sample which are of relevance to a deep neural network identifying a feature in that sample. Use of those methods can allow the system to focus only on those portions or elements of an image which are of relevance to the triggering of recognition of a feature relevant to an outcome.

According to one embodiment of the invention, an entry in the feature recognition library comprises a combination of: one or more elements of the sample in the input library and an indication obtained from the gradient based method of relative importance of the one or more elements of the sample in the input library in the triggering of recognition of the feature by the deep neural network. Such a feature allows for a feature recognition library to be formed from only those portions of a sample in the input library which are of relevance to the feature being triggered. The feature recognition library associated with a given feature is therefore likely to be a more concise version of the full training library. Such a more concise library can aid efficient data processing and allow for the more efficient extraction of relevant information to a recognised feature of relevance to an outcome.

According to one embodiment of the invention, synthesising a plurality of one or more elements of a sample which have characteristics which trigger recognition of the feature by the deep neural network comprises: using a generative modeling method guided by the feature recognition library. Such an approach can help ensure that entries in the feature recognition library are intelligently used by a generative modeling method to create or simulate input samples which would trigger recognition of a feature relevant to an outcome by the deep neural network. Being able to generate "fake" portions of images which would trigger recognition of a feature by the system allow for operation of the system to be understood and allow for improvement of the system. For example, the system recognises a feature as being of relevance to an outcome, generation of fake versions of (portions of) images which would trigger recognition of the feature can allow for analysis of whether that feature is of genuine relevance, as assessed by domain experts, to the outcome. The fake or "generated" images may identify aspects of an image previously unknown to domain experts as being of relevance to an outcome, and such information may be used to improve or add recognition of that feature to other systems seeking to report on or identify a particular outcome. The fake or "generated" images may identify aspects of an image to domain experts which can be assessed as being artefacts of image capture in the training library and therefore as not being of relevance to an outcome, and the training library can be updated to remove images including such artefacts, therefore providing a more accurate and precise system.

According to one embodiment of the invention, the generative modeling method comprises one or more of: a generative adversarial network or variational autoencoder. A technique that can be used in relation to features identified by a deep neural network is that of Generalized Adversarial Networks (GANs) (see, for example, Generative Adversarial Networks [Ian J. Goodfellow, Generative adversarial networks, June 2014]). A GAN typically operates to simultaneously train a 'generator' and a 'discriminator' based on, for example, a plurality of example images. The generator operates to transform an input seed from a random number generator into an image of the same size and shape as the example images. In other words, the generator operates to create fake images. The discriminator is optimized to tell the difference between 'real' images (the examples) and 'simulated', 'faked' or 'synthesised' images (images created by the generator). The generator is optimized to produce images that 'fool' the discriminator, i.e. are mistaken for real images. The result of a trained GAN is a generator that transforms a continuous space of random numbers into a continuous space of images that look like the images in the plurality of example images. Such an approach allows for a "mathematical" result generated to be converted into images which can them be considered by a domain expert, allowing the suitability of the system trained to recognise a particular output to be assessed.

According to one embodiment of the invention, the method comprises: selecting a feature relevant to an outcome to be represented. Features are linked to nodes in a selected layer of a deep neural network. When a node is activated (i.e. outputs a high value) for a certain sample input, the sample is said to contain the corresponding feature. Typically, the selected layer from which a feature will be represented would be one of the last layers before the neural network output, since such layers contain the most high-level features which are combined into a model decision or output. It will, however, be appreciated that deeper layers may be selected depending on visualization needs. The choice of layer may be changed after viewing an initial visualization. For example, if the initial visualization shows features that are too high/low level, a deeper/less deep layer can be selected instead. In some examples all features or nodes in a layer may be represented, in some arrangements, as an alternative to visualizing all features or nodes in a selected layer, a user may select specific nodes, which may be in different layers, in the network. Choosing high level layers allows for larger more complex "features" to be generated for assessment of the suitability of the system.

According to one embodiment of the invention, the method further comprises: using the deep neural network to recognise an alternative feature in the plurality of samples associated with the outcome; creating an alternative feature recognition library from the input library by identifying one or more elements in each of the plurality of samples in the input library which trigger recognition of the alternative feature by the deep neural network; using the alternative feature recognition library to synthesise a plurality of one or more elements of a sample which have characteristics which trigger recognition of the alternative feature by the deep neural network; and using the synthesised plurality of one or more elements to provide a representation of the alternative feature identified by the deep neural network in the plurality of samples associated with the outcome. Accordingly, as mentioned above, more than one feature constructed by a deep neural network may be visualised. In some examples all features or nodes in a layer may be represented, in some arrangements, as an alternative to visualizing all features or nodes in a selected layer, a user may select specific nodes, which may be in different layers, in the network. Such an approach can allow the way in which the system functions to identify an outcome from an input transparent to a user.

According to one embodiment of the invention, the alternative feature recognised by the deep neural network is selected such that the difference between the one or more elements in each of the plurality of samples which trigger recognition of the feature and the alternative feature by the deep neural network is maximised. Accordingly, the features which are represented or visualised by means of the method of the first aspect may be recognised as "distinct" by a user trying to understand operation of the deep neural network. In other words, steps may be taken to trying to keep feature recognition libraries operational on distinct "features" recognised by the network. In some embodiments, using the deep neural network to recognize features that are relevant to the outcome based on a set of training examples may involve taking steps such that the features that are recognized are distinct from each other.

According to one embodiment of the invention, the samples comprise: images, sounds or signal traces. Such images may comprise medical imaging images such as x-rays, MRI images, Ultrasound images and the like, the sounds may comprise appropriate medical recordings and signal traces may comprise traces such as EEG or ECG traces. Each sample may exhibit sample-specific "features".

Turning now to a more specific illustrative example in which a deep neural network is used in relation to images:

General Architecture

Figure 1A:
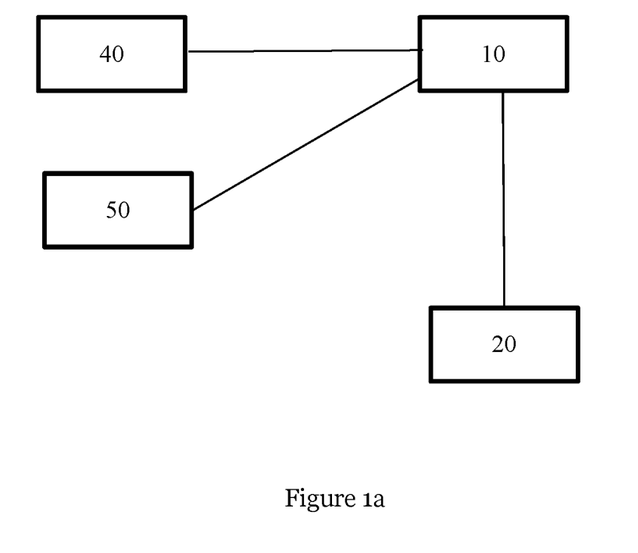
FIG. 1a illustrates an arrangement of image processing apparatus according to one embodiment.

FIG. 1a illustrates an arrangement of the image processing apparatus according to one embodiment. A data processor 10 is provided which is coupled with a user display 20. Image data 40 is provided to the data processor 10, either in real time or from storage 50. The image data may be provided from a variety of different sources in any of a number of different formats. The image data may comprise individual 2-dimensional image frames, 3-dimensional image data, audio files, trace recordings or similar. It will be appreciated that any of a variety of different types of image data may be used.

Machine Learning Algorithm Architecture

Figure 1B:
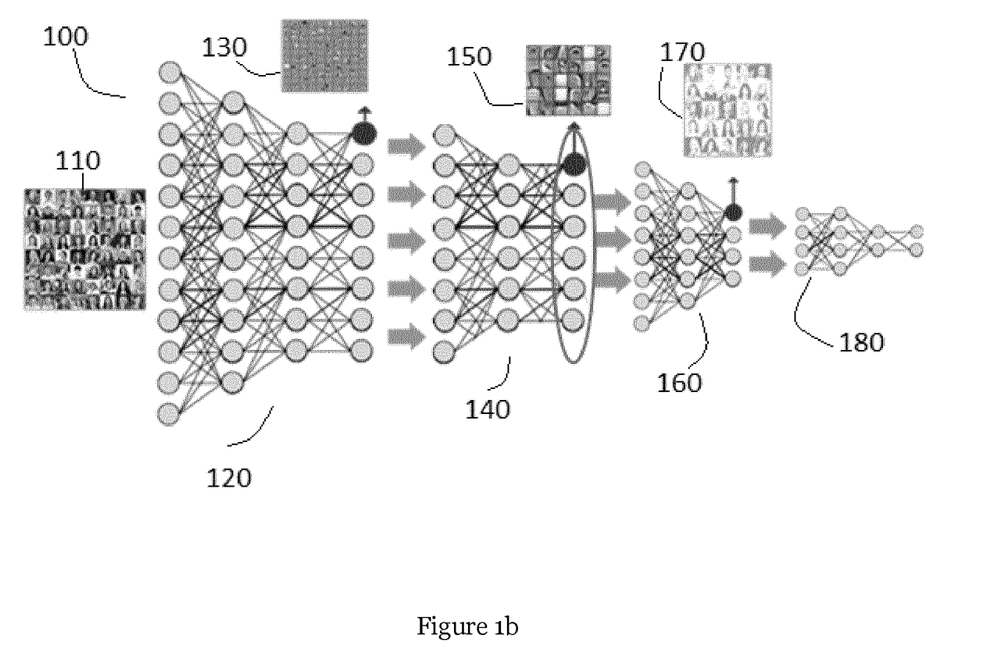
FIG. 1b illustrates schematically a typical outline of a deep neural network used for image classification.

FIG. 1b illustrates schematically a typical outline of a deep neural network used for image classification. Embodiments of the invention utilise a deep neural network (DNN) or model executing on the data processor 10 to perform feature recognition on the image data. FIG. 1b illustrates schematically a typical outline of a deep neural network used for image classification. The network shown schematically in FIG. 1b is such that an input image enters on the left and the model created by the deep neural network is such that subsequent model layers generate more and more abstract features as the image progresses through the deep neural network.

In the example deep neural network 100 shown in FIG. 1b, a training library of input images 110, in this instance, colour images of faces, can be provided. Input layer 120 of the deep neural network may operate to identify features 130 comprising patterns of local contrast. "Hidden" layer 140 of the deep neural network may operate to identify features 150 comprising combinations of patterns of local contrast which represent face features, for example, a nose, an eye or similar. Hidden layer 160 of the deep neural network may operate to identify features 170 comprising combinations of face features, representative of a face. Output layer 180 of the deep neural network may operate to identify a particular type of face outcome, for example, a female face or a child face, dependent upon an outcome which the deep neural network has been trained to recognise.

It will be appreciated that methods in accordance with the invention can be implemented such that a layer at the desired abstraction level in a deep neural network can be chosen for feature visualisation. In other words, in the example given, the invention can be used to visualise face features 150, or faces 170, or both. Similarly, when implementing methods in accordance with the invention, layer units can be activated for a specific input image.

One example of a deep neural network that could be used in image classification is a standard convolutional neural network. Its architecture, assuming input images of dimension 256×256×3 (the final dimension (3) describing the RGB colour information of the image pixels) could be as follows:

| Layer nr: | Layer description: | Output dimension: |
|---|---|---|
| 1 | Input layer | 256 × 256 × 3 |
| 2 | Convolutional layer, filter = 3 × 3 × 8 | 256 × 256 × 8 |
| 3 | Convolutional layer, filter = 3 × 3 × 8 | 256 × 256 × 8 |
| 4 | Maxpool | 128 × 128 × 8 |
| 5 | Convolutional layer, filter = 3 × 3 × 16 | 128 × 128 × 16 |
| 6 | Convolutional layer, filter = 3 × 3 × 16 | 128 × 128 × 16 |
| 7 | Maxpool | 64 × 64 × 16 |
| 8 | Convolutional layer, filter = 3 × 3 × 32 | 64 × 64 × 32 |
| 9 | Convolutional layer, filter = 3 × 3 × 32 | 64 × 64 × 32 |
| 10 | Maxpool | 32 × 32 × 32 |
| 11 | Convolutional layer, filter = 3 × 3 × 64 | 32 × 32 × 64 |
| 12 | Convolutional layer, filter = 3 × 3 × 64 | 32 × 32 × 64 |
| 13 | Maxpool | 16 × 16 × 64 |
| 14 | Convolutional layer, filter = 3 × 3 × 64 | 16 × 16 × 64 |
| 15 | Convolutional layer, filter = 3 × 3 × 64 | 16 × 16 × 64 |
| 16 | Maxpool | 8 × 8 × 64 |
| 17 | Flatten | 1 × 1 × 4096 |
| 12 | Fully connected layer | 1 × 16 |
| 13 | Fully connected layer | 1 × 5 |
| 14 | Softmax layer | 1 × 5 |

In such an example network, the convolutional layers convolute in an area of 3×3 pixels around each pixel. The third dimension given for the convolutional layers is the number of output features for that layer. Each convolutional layer has a rectified linear unit (ReLU) output activation function. Convolution around the pixels at the border of the image assume a zero adding around the image (convolution mode is 'same') in the calculation of the convolution output. The maxpool layer returns the maximum value in pixel blocks of 2×2, with a stride of 2 in both the horizontal and vertical direction. The model assumes a 5 class classification network, where the softmax layer makes sure the models 5 outputs sum to one (output normalization).

Figure 2A:
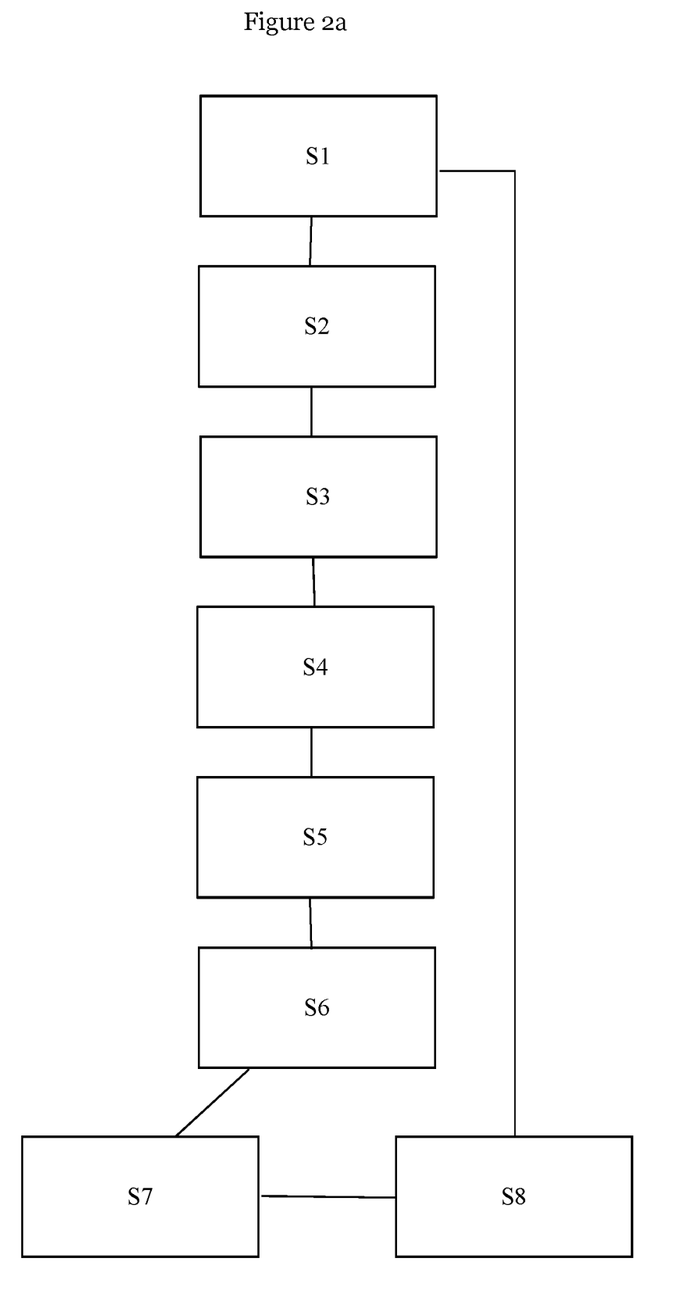
FIG. 2a is a schematic illustrating possible steps of a method of an illustrative general example according to an embodiment of the invention.

Illustrative examples are such that image features can be constructed by a deep neural network in a usual way, i.e. by training a deep network for a specific image analysis task as set out above, before further steps are taken. FIG. 2a is a schematic illustrating main steps of a method of an illustrative general example according to the invention.

Methods of embodiments of the invention typically comprise the following steps:

S1: A deep neural network such as the one described above is provided with a training library comprising a plurality of samples associated with an outcome. The deep neural network is used to recognise one or more features in a plurality of samples in the training library which are associated with the outcome of interest.

S2: A feature identified by the deep neural network as being associated with an outcome of interest is selected for further study. Such a feature may, for example, be chosen as output node number 7 of layer 12 in the example network given above. The output nodes of this layer represent 16 of the example network's highest level features.

S3: Images are then fed to the trained deep neural network. Those images may be from the training library or may be a separate set of images. From the images fed to the deep neural network, those which activate recognition of the selected feature (from step S2) are identified. The term "activate" may be defined in various ways: at a most sensitive level, a feature may be considered activated if a corresponding node takes a non-zero value (note that the relu activation sets all negative outputs to zero). As an alternative, the top percentile of node activation values may be taken as an activation threshold, or a node could be defined as activated if its output value is a maximum output value of all nodes in the layer.

S4: The data processor (see FIG. 1a) is then configured to identify one or more elements in each of the plurality of samples fed to the deep neural network which triggered recognition of the feature relevant to the outcome by the deep neural network. In particular, elements of images in the input library which are identified as causing "activation" of the deep neural network to recognise the selected feature relevant to the outcome are highlighted and identified, for example, by use of gradient-type methods.

A clear explanation of a gradient type method and its implementation can be found in 'Grad-CAM: Visual Explanations from Deep Networks via Gradient-based Localization', R. R. Selvaraju et al, 2017, arXiv: 1610.02391v3.

Figure 2B:
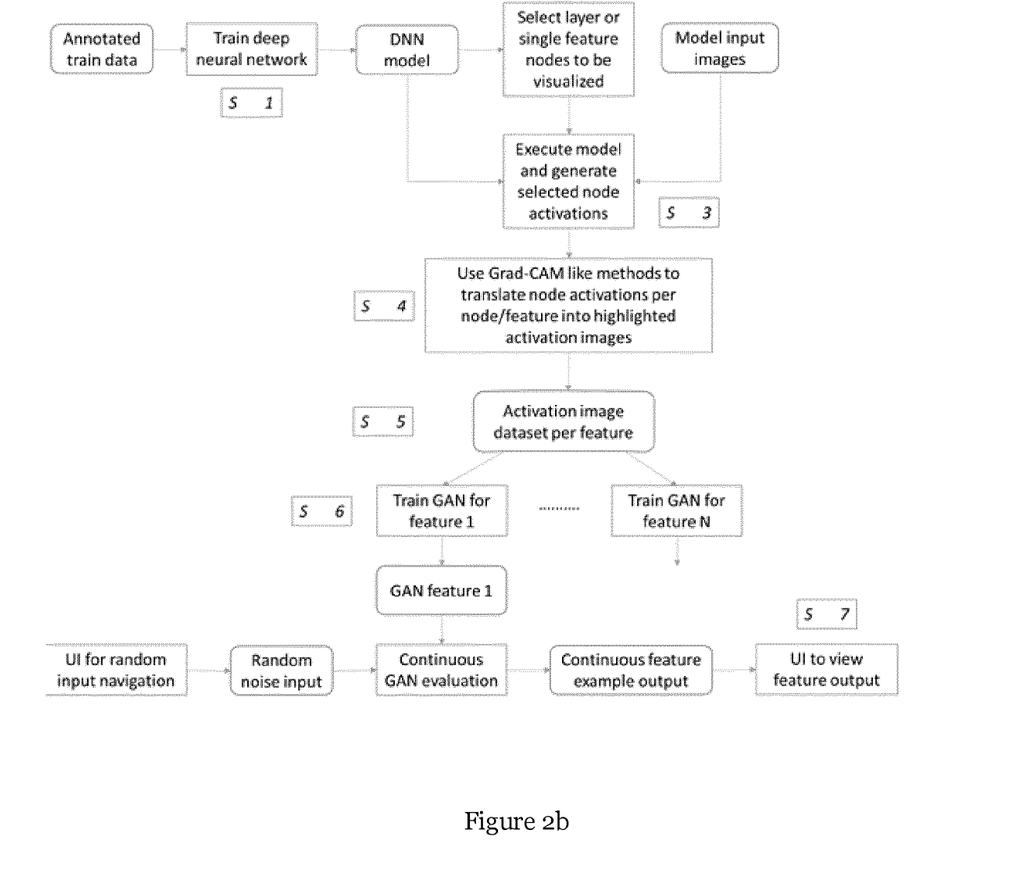
FIG. 2b is a schematic illustrating in detail possible steps of a method of an illustrative example.
Figure 2C:
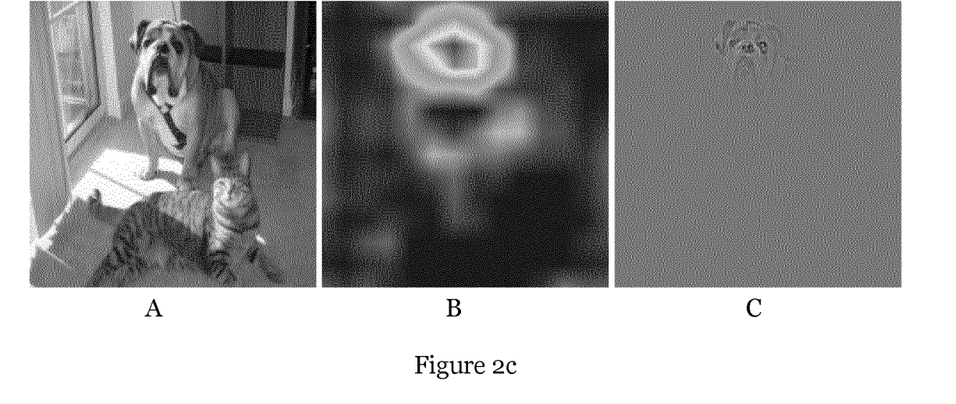
FIG. 2c illustrates an example of GradCAM output for a network feature.

FIG. 2c illustrates an example of GradCAM output for a network feature that appears to correlate with 'dog'. In general, GradCAM methods are used to take a final output feature of a network as examples to be highlighted in an input image. Visualized features in accordance with the present invention may however comprise a "deeper" feature. For example, in a network where 'dog present' is one of the features that contributes to a model output/outcome, for example, 'house inhabited' vs 'house abandoned'.

FIG. 2a(A) shows an input image, FIG. 2a(B) shows a heatmap indicating a relative contribution of each pixel to activation of the selected feature (dog) and FIG. 2a(C) shows a 'guided GradCAM' visualization as described in Selvaraju et al, 2017.

S5: The system operates to create a "feature recognition library" from the information collected at step S4. That library is a collation of those elements in images which cause activation of recognition of a feature by the deep neural network. Such elements may be extracted from the output of the gradient type method from S4 in the following way:

A feature image size (width and height) is chosen that is smaller than the dimension of the original image. A moving window approach is used to identify the one or more locations where the sum of the pixel contributions (as indicated in a heatmap) summed over the pixels that fall within the window form a local maximum. Practically, a box is drawn around each blob of high contribution inside the heatmap. The coordinates of the selected window locations are subsequently used to crop the input image to create feature images that together form the 'feature recognition library'.

Figure 2D:
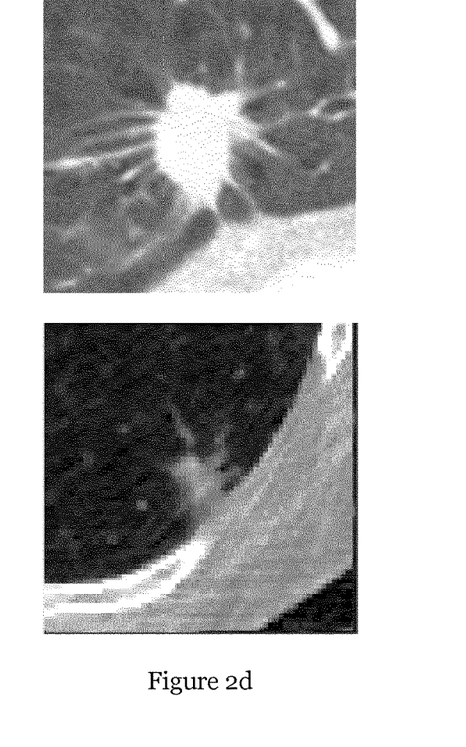
FIG. 2d shows examples of portions of images which can form part of a feature recognition library in accordance with some embodiments.

FIG. 2d shows examples of portions of images or "crops" that may be found and form part of a feature recognition library as part of visualization of the features recognised by a deep neural network configured to classify CT images into 'cancer' vs 'no cancer'.

S6: The generated feature recognition library can be used by the data processor 10 to synthesise, for example, by use of appropriate iterative computational techniques, a plurality of one or more elements of a sample which have characteristics which trigger recognition of the selected feature by the deep neural network.

S7: The synthesised plurality of one or more elements can be used, as required. For example, being able to synthesize elements in an image which trigger recognition of a feature by the deep neural network can allow for a greater understanding of the operation of the deep neural network. It is possible to provide a representation of the feature identified by the deep neural network in the plurality of samples associated with the outcome. The representation can be visual and that visualisation can be simply presented to a domain expert.

S8: The information available via step S7 can be used to improve the operation of the deep neural network. For example, features which are known to be of interest in relation to an outcome which are absent from those features identified by a deep neural network may be identified as being missing from the training library. The training library may therefore be updated, fed to the deep neural network at training stage S1, and the system therefore improved.

In other words, a system in accordance with the invention is such that once a deep neural network is trained using a training library, a further large set of images, an input library, can be used to cause the deep neural network to activate constructed features. The system operates such that the image regions that cause the activation of a constructed feature can be identified and stored on a per feature basis. It will be appreciated that images need not be annotated as long as they are domain relevant.

The stored information represents a feature-specific database of visual examples in relation to each constructed feature. The system uses the feature-specific database created in a next step and an appropriate generation technique, for example, a GAN, is trained in relation to each feature, to generate images which would trigger the trained deep neural network to recognise a feature. It will be appreciated that any appropriate mechanism for training a system to recognise/generate elements of an image which cause the deep neural network to activate a feature in relation to an image can be used, it need not be a GAN.

Each GAN's generator can operate to interpolate between generated visual examples forming the feature specific library and thus can give a more comprehensive view of the learned feature. In some arrangements, a GAN generator may be coupled with GUI tools, for example, sliders, which can allow both AI and medical domain experts to analyse visual features constructed by a deep neural network and, where appropriate, express them in domain relevant terms.

In some illustrative examples it is recognised that it may be useful to maximize a difference between features constructed by the deep neural network which are fed to a GAN. In other words, to maximise a difference between GANs for different features. Accordingly, overlap between different features and the generated views of different features can be minimised and a person skilled in the art can more clearly visualise each feature (as distinct from any other constructed feature recognised by a deep neural network).

FIG. 2b is a schematic illustrating steps of a method in accordance with one illustrative example. As shown, a system such as that shown in FIG. 1a may be operable to perform a method as a number of consecutive steps as set out below.

Step 1 (S1). A convolutional deep neural network is trained on an image classification or segmentation task in a usual way (see, for example, ImageNet Classification with Deep Convolutional Neural Networks [Alex Krizhevsky, Ilya Sutskever and Geoffrey E. Hinton, Advances in Neural Information Processing Systems 25 (NIPS 2012)], or similar).

Step 2 (S2). One of the deep neural network layers near output (classification, segmentation) can be selected to have its features visualized. The selected layer may have all its features visualised. Features are linked to nodes in the selected layer. When a node is activated (i.e. outputs a high value) for a certain image input, the image is said to contain the corresponding feature.

Typically, the selected layer would be one of the last layers before the network output, since such layers contain the most high-level features which are combined into a model decision or output. It will, however, be appreciated that deeper layers may be selected depending on visualization needs. The choice of layer may be changed after viewing an initial visualization. For example, if the initial visualization shows features that are too high/low level, a deeper/less deep layer can be selected instead. In some examples, as an alternative to visualizing all features or nodes in a selected layer, a user may select specific nodes, which may be in different layers, in the network.

Step 3 (S3). A number of example images (for example, from a training or validation set relating to a domain on which the model created by the deep neural network is optimized in relation to) are used as an input to the model. The images need not be annotated. Each image input to the model can cause activation of one or more feature nodes in a selected layer.

Step 4 (S4). A visualization method, for example, Grad-CAM, can be used to highlight one or more elements of one specific image for one specific activated feature node (for each image and each node in the selected layer). It will be appreciated that for image classification, pixels throughout a complete (possibly large) input image may be highlighted to explain the activation of a single node. For segmentation, an activated node corresponds typically to a subsection (or patch) of an input image.

A highlighted image may comprise (a part of) an original input image plus a heat map/weight map overlay which indicates, for example, per pixel, how much that pixel contributes to the model output (i.e. feature activation). In relation to illustrative examples, the combination of original image parts and heat/weight map can itself be expressed as an example image, of the same size as, or smaller than, an original input image.

It will be appreciated that there are various ways in which example images can be produced:

For segmentation tasks, the model output is itself an image, and each layer in the network also corresponds to an image (generally of lower resolution and with more features per pixel than the input image). Each activated feature node therefore relates to a specific output or intermediate image pixel. The nature of convolutional segmentation networks is that each output (or intermediate) pixel is influenced only by a subset of (or patch within) the original image, the maximum size (or 'field of view') of which is determined by network architecture. The example image for an activated feature node may then simply be the patch in the input image relating to its field of view. For classification tasks, the field of view for the final model output (and often for the penultimate layers) is the complete input image. Here, smaller feature node activation examples may, for example, be generated by a moving window approach over the input image, where patches of desired dimensions are selected if the pixels they contain are assigned more than a minimum average weight in the heat map/weight map overlay of the input image. Areas that are not highlighted in the heat map will therefore not be selected, whereas areas that "light up" brightly (ie have significant heat or weight attributed to them), will be.

Other methods may be applied, but these are the most straightforward. Of course, the windowing method may also be applied for segmentation models. Such an approach may be desirable if the aforementioned field of view in such models covers a large part of the input image.

Step 5 (S5). All highlighted images that are produced by a visualization method described generally in step 4 can be stored per feature, resulting in one image database per feature.

The next steps are described in relation to one feature, but can be executed for each feature separately, as shown schematically in FIG. 2b.

Step 6 (S6). A GAN generator is trained on the highlighted images per feature. The GAN generator is configured to generate representative images in relation to the selected feature.

Step 7 (S7). A trained generator of a feature GAN can be embedded in a graphical user interface which can allow an expert user to explore the feature image example space.

It will be appreciated that Step 1 (S1) to Step 7 (S7) described in relation to FIG. 2b correspond to the general steps S1 to S7 set out in the overview of the method in relation to FIG. 2a.

Figure 3:
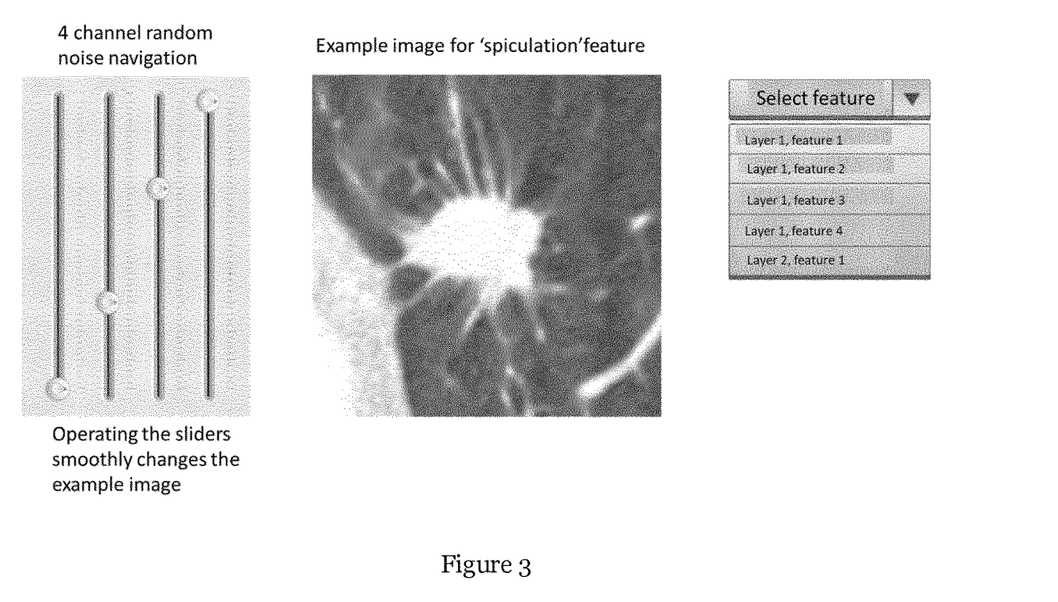
FIG. 3 shows a possible illustrative example of a feature exploration graphical user interface.

FIG. 3 shows a possible illustrative example of a feature exploration graphical user interface which may allow a domain expert to explore the output of a GAN trained in relation to a feature. That is to say, the mathematical understanding of elements in an image which will trigger the deep neural network to recognise a feature in an image can be provided to a user in a visual format. A user may explore feature image example space as set out below.

a. A GAN generator functions by transforming an N-dimensional random number space into a representative image. A GUI starts at one specific choice for random input values (random choice, central point, etc.) corresponding to one output example b. The GUI has a method to navigate through random input space. one way to implement a navigation method is by providing N sliders, one associated with each of the random input space's dimensions, sliding from its minimum to its maximum allowed value. Other methods to explore multi-dimensional space may be used.

c. On moving through random input space, GAN generated images corresponding to the selected random input will be shown to the user continuously, resulting in example features morphing from one into the other.

d. Instead of a user-led exploration of random space/feature space, random inputs may also be generated via a random walk through random input space, resulting in a movie of smoothly and continuously varying feature examples being shown to a user.

It will be appreciated that illustrative examples described may provide a visualization tool which can offer an expert user a smooth/continuous representation of visual features constructed or identified by a deep neural network. The visualization tool can be used to assist collaboration between AI and domain experts in a development and improvement phase of a deep neural network assigned to a specific task. The visualization tool can be used as a supporting tool for explainable AI relating to medical applications, for example, in regulatory approval and clinical application phase, the output of systems and methods in accordance with the invention can allow a mechanism to identify ways to improve operation of the deep neural network, for example, by highlighting gaps in a training library, anomalous images (those including hospital/image capture features irrelevant to a desired outcome) in a training library, recognising features which are relevant to an outcome, but previously unknown to a domain expert, and similar.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of providing a representation of a feature identified by a deep neural network as being relevant to an outcome, said method comprising:

providing the deep neural network with a training library comprising a plurality of samples associated with the outcome;

training the deep neural network to recognize a feature in the plurality of samples associated with the outcome;

creating a feature recognition library from an input library by identifying one or more elements in each of a plurality of samples in the input library which trigger recognition of the feature by the deep neural network;

using the feature recognition library to synthesize a plurality of one or more elements of a sample which have characteristics which trigger recognition of the feature by the deep neural network; and using the synthesized plurality of one or more elements to provide a representation of the feature identified by the deep neural network in the plurality of samples associated with the outcome.

2. The method according to claim 1, wherein the representation of the feature comprises: a continuous library of synthesized examples which have characteristics which trigger recognition of the feature by the deep neural network.

3. The method according to claim 1, wherein identifying one or more elements in each of the plurality of samples in the input library which trigger recognition of the feature by the deep neural network comprises: using a gradient based method to identify one or more elements in each of the plurality of samples which trigger recognition of the feature.

4. The method according to claim 3, wherein said gradient based method comprises: one or more of: Grad-CAM, CAM, deconvolution or guided back-propagation.

5. The method according to claim 3, wherein an entry in said feature recognition library comprises a combination of: one or more elements of said sample in the input library and an indication obtained from said gradient based method of relative importance of said one or more elements of said sample in the input library in the triggering of recognition of the feature by the deep neural network.

6. The method according to claim 1, wherein synthesizing a plurality of one or more elements of a sample which have characteristics which trigger recognition of the feature by the deep neural network comprises: using a generative modelling method guided by the feature recognition library.

7. The method according to claim 6, wherein the generative modelling method comprises one or more of: a generative adversarial network or variational autoencoder.

8. The method according to claim 1, wherein said method comprises selecting a feature relevant to an outcome to be represented.

9. The method according to claim 1, further comprising:
using the deep neural network to recognize an alternative feature in the plurality of samples associated with the outcome;
creating an alternative feature recognition library from the input library by identifying one or more elements in each of the plurality of samples in the input library which trigger recognition of the alternative feature by the deep neural network;
using the alternative feature recognition library to synthesize a plurality of one or more elements of a sample which have characteristics which trigger recognition of the alternative feature by the deep neural network; and
using the synthesized plurality of one or more elements to provide a representation of the alternative feature identified by the deep neural network in the plurality of samples associated with the outcome.

10. The method according to claim 9, wherein the alternative feature recognized by the deep neural network is selected such that the difference between the one or more elements in each of the plurality of samples which trigger recognition of the feature and the alternative feature by the deep neural network is maximized.

11. The method according to claim 1, wherein the samples comprise images, sounds or signal traces.

12. The method according to claim 11, wherein the samples comprise images including x-ray images, magnetic resonance images, ultrasound images, computed tomography images, positron emission tomography images, digital pathology images, cytology images, and/or radiology images.

13. A non-transitory computer readable medium storing instructions operable, when executed by one or more processors, to:
provide a deep neural network with a training library comprising a plurality of samples associated with an outcome;
train the deep neural network to recognize a feature in the plurality of samples associated with the outcome;
create a feature recognition library from an input library by identifying one or more elements in each of a plurality of samples in the input library which trigger recognition of the feature by the deep neural network;
use the feature recognition library to synthesize a plurality of one or more elements of a sample which have characteristics which trigger recognition of the feature by the deep neural network; and
use the synthesized plurality of one or more elements to provide a representation of the feature identified by the deep neural network in the plurality of samples associated with the outcome.

14. The computer readable medium according to claim 13, wherein the samples comprise images, sounds or signal traces.

15. The computer readable medium according to claim 14, wherein the samples comprise images including medical images.

16. The computer readable medium according to claim 15, wherein the medical images include x-ray images, magnetic resonance images, ultrasound images, computed tomography images, positron emission tomography images, digital pathology images, cytology images, and/or radiology images.

17. An apparatus to provide a representation of a feature identified by a deep neural network as being relevant to an outcome, said apparatus comprising:
a deep neural network trained with a training library comprising a plurality of samples associated with the outcome and configured by said training to recognize a feature in the plurality of samples associated with the outcome;
library creation logic configured to create a feature recognition library from an input library by identifying one or more elements in each of a plurality of samples forming the input library which trigger recognition of the feature by the deep neural network;
synthesis logic configured to use the feature recognition library to synthesize a plurality of one or more elements of a sample which have characteristics which trigger recognition of the feature by the deep neural network; and
feature visualization logic configured to use the synthesized plurality of one or more elements to provide a representation of the feature identified by the deep neural network in the plurality of samples associated with the outcome.

18. The apparatus according to claim 17, wherein the samples comprise images, sounds or signal traces.

19. The apparatus according to claim 18, wherein the samples comprise images including medical images.

20. The apparatus according to claim 19, wherein the medical images include x-ray images, magnetic resonance images, computed tomography images, positron emission tomography images, digital pathology images, cytology images, and/or radiology images.

* * * * *